United States Patent
Yang et al.

(10) Patent No.: US 9,098,243 B2
(45) Date of Patent: Aug. 4, 2015

(54) DISPLAY DEVICE AND METHOD FOR ADJUSTING OBSERVATION DISTANCES THEREOF

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Min Yang, Wuhan (CN); Xin-Shu Wang, Wuhan (CN); Jian-Hung Hung, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 27 days.

(21) Appl. No.: 14/142,952

(22) Filed: Dec. 30, 2013

(65) Prior Publication Data

US 2014/0193036 A1    Jul. 10, 2014

(30) Foreign Application Priority Data

Jan. 5, 2013  (CN) .......................... 2013 1 0017116

(51) Int. Cl.
  *G06F 1/16*    (2006.01)
  *G06K 9/00*    (2006.01)
  *G06T 7/00*    (2006.01)

(52) U.S. Cl.
  CPC .............. *G06F 1/166* (2013.01); *G06F 1/1605* (2013.01); *G06K 9/0061* (2013.01); *G06K 9/00308* (2013.01); *G06K 9/00912* (2013.01); *G06T 7/004* (2013.01); *G06T 7/0042* (2013.01); *G06T 2207/30201* (2013.01)

(58) Field of Classification Search
  CPC ..... G06F 1/166; G06F 1/1605; G06K 9/0061; G06K 9/00912; G06K 9/00308; G06T 7/0042; G06T 7/004; G06T 2207/30201
  USPC ......................................................... 382/103
  See application file for complete search history.

(56) References Cited

U.S. PATENT DOCUMENTS

| | | | | |
|---|---|---|---|---|
| 5,839,000 | A * | 11/1998 | Davis, et al. | 396/51 |
| 6,733,130 | B2 * | 5/2004 | Blum et al. | 351/216 |
| 7,296,774 | B2 * | 11/2007 | Oh | 248/324 |

* cited by examiner

*Primary Examiner* — Utpal Shah
*Assistant Examiner* — Kate R Duffy
(74) *Attorney, Agent, or Firm* — Novak Druce Connolly Bove + Quigg LLP

(57) ABSTRACT

A method for adjusting an observation distances between an user and a display device is provided. When the display device determines that the user is squinting and determines a distance value between the user and the display device is larger than a predetermined value, the display device controls a driving unit to drive a display unit of the display device to move toward to the user. A display device is also provided.

11 Claims, 3 Drawing Sheets

DISPLAY DEVICE AND METHOD FOR ADJUSTING OBSERVATION DISTANCES THEREOF

BACKGROUND

1. Technical Field

The present disclosure relates to display devices and methods for adjusting observation distances thereof.

2. Description of Related Art

Generally, to improve viewing quality, a manual adjustment of a display device is required to change an observation distance. However, this is inconvenient.

Therefore, it is desirable to provide a display device and a method for adjusting observation distances between the user and the display device thereof, which can overcome the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean "at least one."

Figure 1:
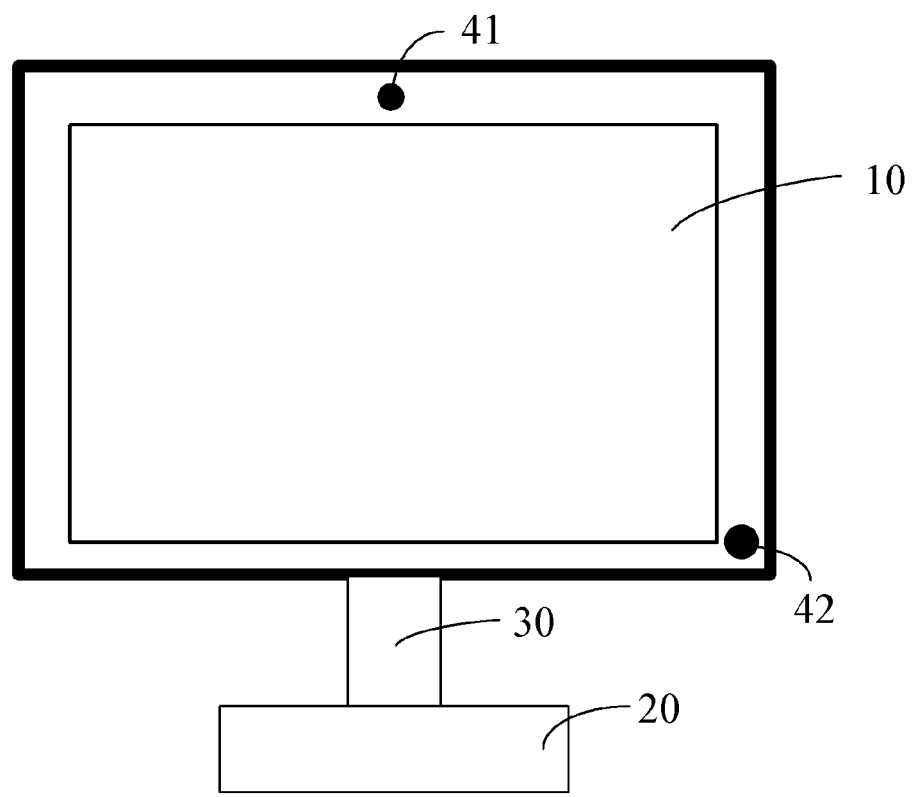
FIG. 1 is a schematic view of a display device, according to an exemplary embodiment.

FIG. 1 shows a display device 100, according to an exemplary embodiment. The display device 100 includes a display unit 10, a base 20, a driving unit 30, an image capturing unit 41 and a range finder 42. In this embodiment, the image capturing unit 41 is a camera, and the range finder 42 is a Laser Range Finder (LRF) or an Infrared Range Finder (IRF).

The driving unit 30 is connected to the display unit 10 and the base 20. The driving unit 30 is configured for driving the display unit 10 to move toward or away from the user. The driving unit 30 can be an automatic driving device that is capable of controlling the display unit 10 to move toward or away from the user in response of a control command, in the illustrated embodiment, an automatic driving device employs a motor and a smart control Integrated Circuit (IC),.

Figure 2:
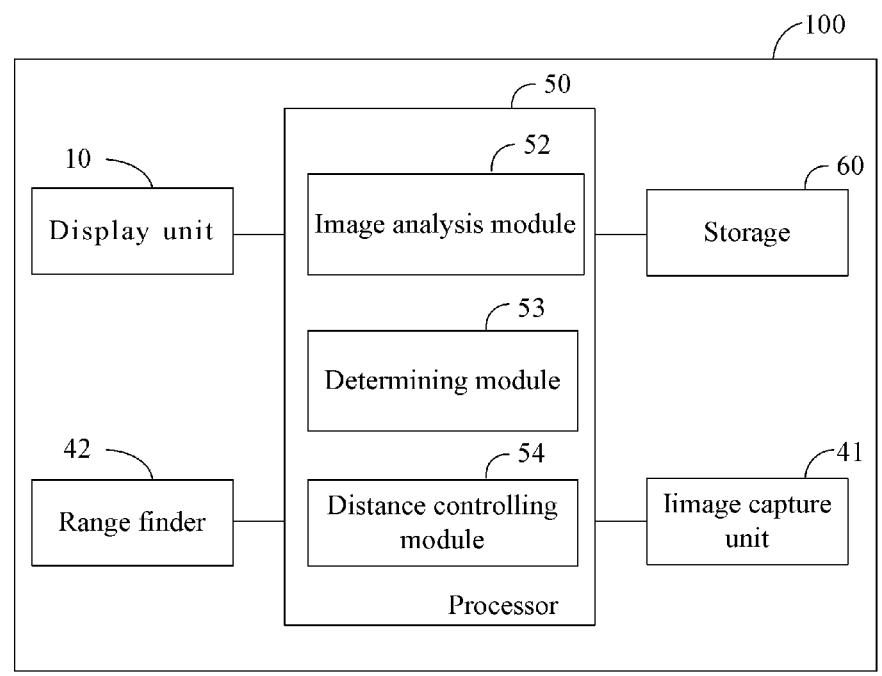
FIG. 2 is a functional block diagram of the display device of FIG. 1.

FIG. 2 shows that the display device 100 further includes a processor 50 and a storage 60. The processor 50 includes an image analysis module 52, a determining module 53 and a distance control module 54.

The image capturing unit 41 is located on the front side of the display unit 10, and configured to capture instant images of a face of the user in front of the display unit 10. The instant image can be captured as follows: the image capturing unit 41 captures an instant image of the scene in front of the display unit 10 after a predetermined duration from a previous image captured, and the instant image are stored in the storage 60. In this embodiment, the image capturing unit 41 captures images of the scene in front of the display unit 10 every second, or half a second.

The image analysis module 52 is configured to detect a face portion of a user in the instant image and determines a spacing value defined between an upper eyelid and a lower eyelid relative to the face portion, the image analysis module 52 further sends the spacing value to the determining module 53. In detail, the image analysis module 52 detects the face portion of the user in the instant image and the position of the upper eyelid and the lower eyelid in the face portion via face recognition and image analysis technology, and then determines the spacing value between the upper eyelid and the lower eyelid. In the present image analysis technologies, skin color and mask can be used for the task of rough location, which give some possible regions of eyes and eyebrows, then gray scanning and analysis is performed to accurately locate the position of the upper eyelid and the lower eyelid in the face portion.

People are always squinting unconsciously when they look at distant objects that appear blurred, so the spacing value between the upper eyelid and the lower eyelid is relative to the user being able to see the content displayed on the display unit 10 clearly.

The range finder 42 is configured to detect a distance value between the user and the display device 100, and send the detected distance value to the processor 50. In this embodiment, the range finder 42 is an Infrared Range Finder.

The determining module 53 is configured to compare the detected distance value detected by the range finder 42 to a predetermined distance value determining if the detected distance value is larger than the predetermined value. In addition, determines if the is user squinting according to the change in spacing values between the upper eyelid and the lower eyelid. In detail, the determining module 53 determines whether the spacing value between the upper eyelid and the lower eyelid is decreased according to the comparison of the current spacing value to a previous spacing value, and further determines whether the next spacing value received in a predetermined time period is smaller than the previous spacing value.

For example, the image capturing unit 41 captures images of the scene in front of the display unit 10 every half a second, the predetermined time period is 2 seconds. If the current spacing value N+1 is smaller than a previous spacing value N, the determining module 53 determining that the spacing value between the upper eyelid and the lower eyelid is decreased. The determining module 53 further determines whether the next spacing values N+2, N+3, N+4 and N+5 received in a predetermined time period are smaller than the previous spacing value N. If yes, the determining module 53 determines that the user is squinting; if not, the determining module 53 determines that the user just blinks.

The distance control module 54 is configured to control the driving unit 30 to drive the display unit 10 to move toward or away from the user. In detail, when the determining module 53 determines that the detected distance value is larger than the predetermined value and the user is squinting, the driving unit 30 is controlled to drive the display unit 10 to move toward the user. If the determining module 53 determines that the detected distance value is smaller than the predetermined value, the distance control module 54 controls the driving unit 30 to drive the display unit 10 to move away from the user.

In other embodiments, the distance control module 54 controls the driving unit 30 to drive the display unit 10 to move toward or away from the user only according to whether the user is squinting. When the determining module 53 determines the user is squinting, the distance control module 54 controls the driving unit 30 to drive the display unit 10 to move toward the user.

In this embodiment, the distance control module 54 controls the driving unit 30 to drive the display unit 10 to move toward or away from the user 50 centimeters at a time.

With such configuration, the display device 100 is capable of automatically adjusting the observation distance between the user and the display device 100 by detecting whether the user is squinting and whether the distance between the user and the display device 100 is larger than the predetermined distance value.

Figure 3:
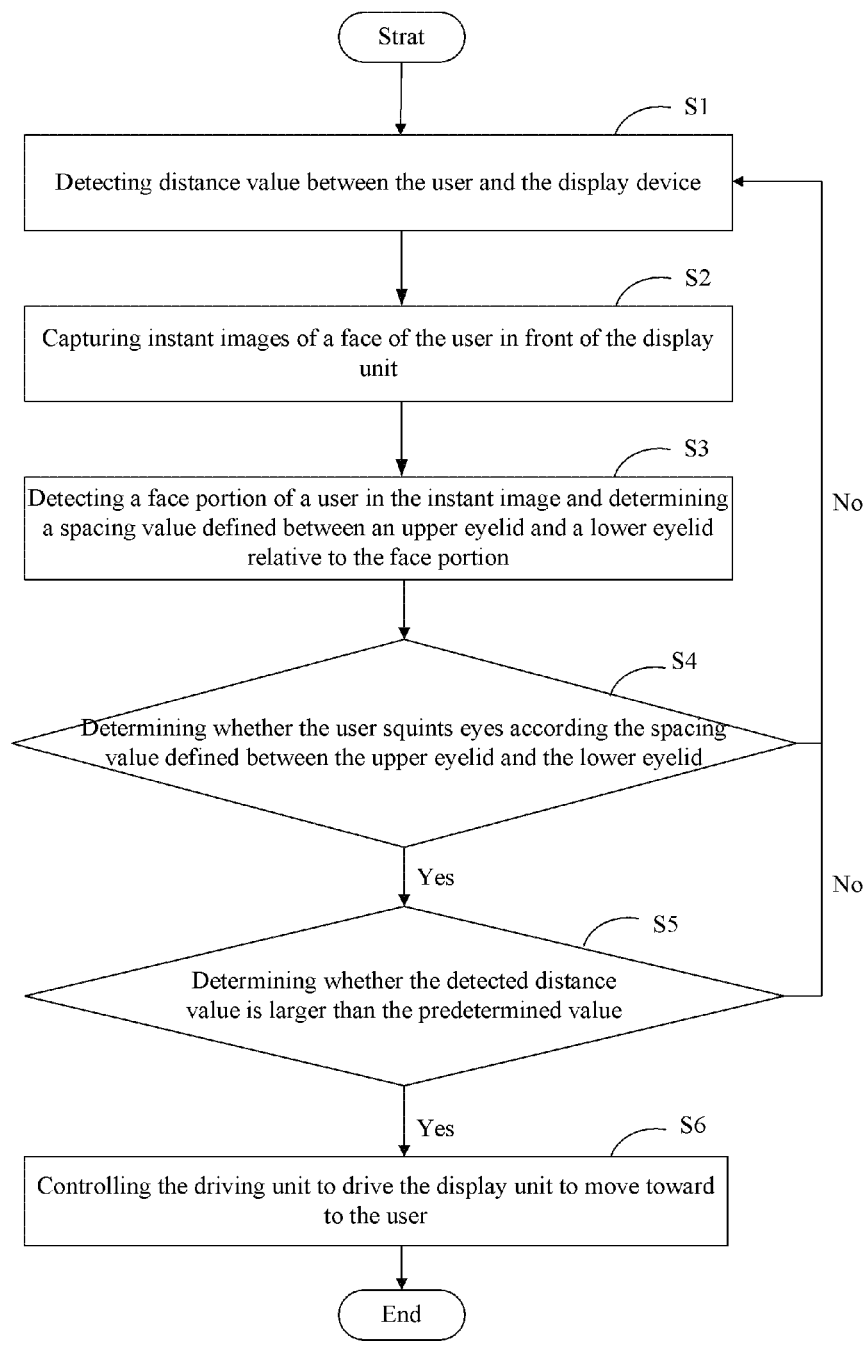
FIG. 3 is a flow chart of a method for adjusting an observation distances between the user and a display device, according to an exemplary embodiment.

FIG. 3 shows a flowchart of a flow chart of a method for adjusting observation distances between the user and the display device 100. The method includes the following steps, each of which is tied to various components contained in the display device 100 as shown in FIGS. 1 and 2.

In step S1, the range finder 42 detects the distance between the user and the display device 100, and sends the detected value to the processor 50.

In step S2, the image capturing unit 41 captures an image of the scene in front of the display unit 10 after a predetermined duration from a previous image captured. The instant image is stored in the storage 60.

In step S3, the image analysis module 52 detects a face portion of a user in the instant image and determines a spacing value defined between an upper eyelid and a lower eyelid relative to the face portion. The image analysis module 52 further sends the spacing value to the determining module 53.

In step S4, the determining module 53 determines whether or not the user is squinting according to the spacing value between the upper eyelid and the lower eyelid, if yes, goes to step 55; if not, goes back to step S1. In detail, when the determining module 53 determines that an current detected distance value is smaller than a previous detected distance value, the determining module 53 further determines whether the next detected distance values received in a predetermined time period are smaller than the previous detected distance value. If yes, the determining module 53 determines that the user is squinting; if not, the determining module 53 determines that the user just blinks.

In step S5, the determining module 53 determines whether or not the detected distance value detected by the range finder 42 is larger than the predetermined value, if yes, goes to step S6; if not, goes back to step S1.

In step S6, the distance control module 54 controls the driving unit 30 to drive the display unit 10 to move toward the user.

In other embodiments, the method illustrated in FIG. 1 can exclude steps S2 and S5, the distance control module 54 controls the driving unit 30 to drive the display unit 10 to move toward or away from the user only according to whether the user is squinting.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A display device, comprising:
    a base;
    a display unit;
    a driving unit connected to the display unit and the base, and configured to drive the display unit to move toward or away from a user in front of the display unit;
    an image capturing unit located on a front side of the display unit, and configured to capture instant images of a face of the user;
    a range finder configured to detect distance value between the user and the display device; and
    a processor, comprising:
        an image analysis module configured to detect a face portion of a user in the instant image and determine a spacing value defined between an upper eyelid and a lower eyelid relative to the face portion;
        a determining module configured to compare the detected distance value detected by the range finder to a predetermined distance value to determine whether the detected distance value is larger than the predetermined value, and further to determine whether the user is squinting according to the change in spacing values defined between the upper eyelid and the lower eyelid; and
        a distance control module configured to control the driving unit to drive the display unit to move toward the user, when the determining module determines that the detected distance value is larger than the predetermined value and the user is squinting.

2. The display device as described in claim 1, wherein the determining module determines whether an current detected distance value is smaller than an previous detected distance value, and when the determining module determines the current detected distance value is smaller than an previous detected distance value, the determining module further determines whether the next detected distance values received in a predetermined time period are smaller than the previous detected distance value to determine that the user is squinting.

3. The display device as described in claim 1, wherein the distance control module controls the driving unit to drive the display unit to move away from the user, when the determining module determines that the detected distance value is smaller than the predetermined value.

4. The display device as described in claim 1, wherein the range finder is an infrared range finder.

5. The display device as described in claim 1, wherein the image capturing unit is a camera.

6. A method for adjusting an observation distances between an user and a display device, the display device comprising a base, a display unit, and a driving unit connected to the display unit and the base, and configured to drive the display unit to move toward or away from a user; the method comprising steps of:
    S1, detecting distance value between the user and the display device using a range finder;
    S2, capturing instant images of a scene in front of the display unit using an image capturing unit;
    S3, detecting a face portion of the user in the instant image and determining a spacing value between an upper eyelid and a lower eyelid relative to the face portion;
    S4, determining whether the user is squinting according to the spacing value defined between the upper eyelid and the lower eyelid, if yes, goes to step 55; if not, goes back to step S1;
    S5, determining whether the detected distance value is larger than the predetermined value, if yes, goes to step S6; if not, goes back to step S1;
    S6, controlling the driving unit to drive the display unit to move toward to the user.

7. The method as described in claim 6, wherein the step S4 further comprising:

determining whether an current detected distance value is smaller than an previous detected distance value, and when the determining module determines the current detected distance value is smaller than a previous detected distance value, further determines whether the next detected distance values received in a predetermined time period are smaller than the previous detected distance value to determine that the user is squinting.

8. The method as described in claim 6, further comprising step:
controlling the driving unit to drive the display unit to move away from the user, when the determining module determines that the detected distance value is smaller than the predetermined value.

9. A display device, comprising:
a base;
a display unit;
a driving unit connected to the display unit and the base, and configured to drive the display unit to move toward or away from a user in front of the display unit;
an image capturing unit located on a front side of the display unit, and configured to capture instant images of a face of the user; and
a processor, comprising:
an image analysis module configured to detect a face portion of a user in the instant image and determine a spacing value defined between an upper eyelid and a lower eyelid relative to the face portion;
a determining module configured to determine whether the user is squinting according the change in spacing values between the upper eyelid and the lower eyelid; and
a distance control module configured to control the driving unit to drive the display unit to move toward from the user, when the determining module determines that the user is squinting.

10. The display device as described in claim 9, wherein the determining module determines whether an current detected distance value is smaller than an previous detected distance value, is yes, the determining module further determines whether the next detected distance values received in a predetermined time period are smaller than the previous detected distance value to determine that the user is squinting.

11. The display device as described in claim 9, wherein the image capturing unit is a camera.

* * * * *